1-20-76  OR  3,933,041

United States Patent [19]
Hyer

[11] 3,933,041
[45] Jan. 20, 1976

[54] BULK MATERIAL LEVEL MEASURING SYSTEM

[75] Inventor: Frank S. Hyer, Duxbury, Mass.

[73] Assignee: Hyer Industries, Inc., Pembroke, Mass.

[22] Filed: Sept. 30, 1974

[21] Appl. No.: 510,422

[52] U.S. Cl. .............................. 73/290 R; 200/61.21
[51] Int. Cl.² ................... G01F 23/00; H01H 35/18
[58] Field of Search.. 73/290 R, 290 V, 305, 304 R, 73/309, 311, 313, 314, 322.5, 317, 318; 116/118 R; 33/126; 340/244 R, 244 D, 244 B; 200/61.21, 61.2

[56] References Cited
FOREIGN PATENTS OR APPLICATIONS

| | | | |
|---|---|---|---|
| 840,608 | 4/1952 | Germany | 73/290 R |
| 1,236,809 | 5/1963 | Germany | 73/304 R |
| 55,748 | 10/1935 | Norway | 73/290 R |

*Primary Examiner*—Richard C. Queisser
*Assistant Examiner*—Joseph W. Roskos

[57] ABSTRACT

A system and method for measuring the level of bulk material stored in a bin, tank, silo or the like. A multiple link chain is disposed along an axis between two vertically displaced reference points with the chain having an upper end above and a lower end below the top surface of bulk material in a bin. All chain links above the top surface of the bulk material are free to rotate with respect to their adjacent links about the chain axis by a predetermined angular displacement before interferingly engaging the adjacent links. A rotational driving means is coupled to the upper end of the chain, said driving means having a predetermined torque limit. The driving means rotates the upper end of the chain about its axis until it encounters a torsional impedance exceeding its torque limit, that impedance being due to bulk material in contact with the lateral surfaces of the chain links which are below the top surface. At this time, the upper end of the chain is angularly displaced by an amount equal to the sum of the individual angular displacements of all links which are disposed above the top surface of the bulk material and thus free to rotate. The angular displacement of the upper end of the chain provides a measure of the level of bulk material in the bin.

18 Claims, 9 Drawing Figures

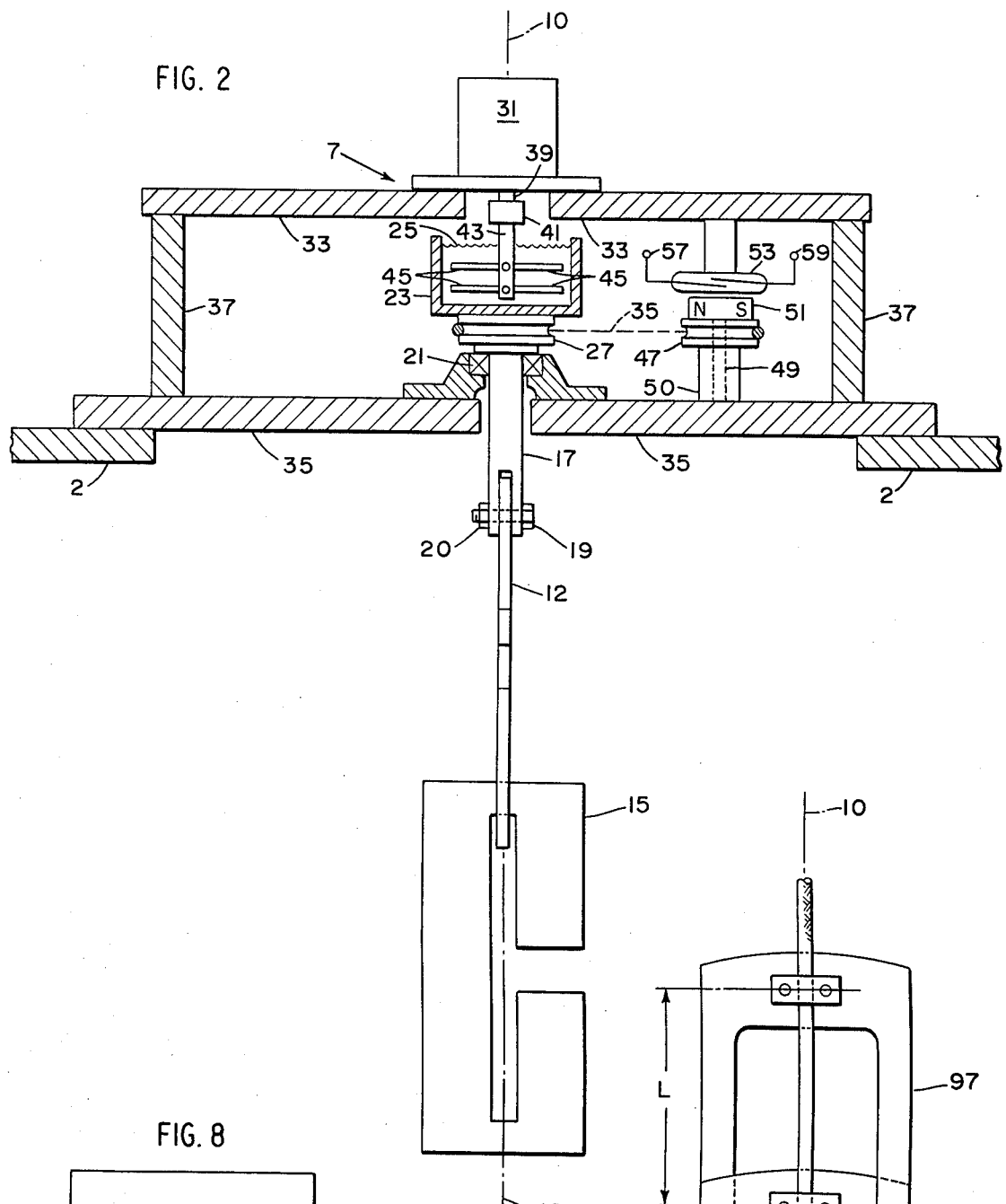
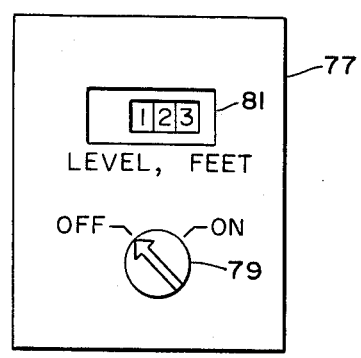

3,933,041

BULK MATERIAL LEVEL MEASURING SYSTEM

BACKGROUND OF THE INVENTION

This invention relates to measurement instrumentation and, more particularly, to means for measuring the level of bulk material stored in a bin, tank, silo, or the like.

DESCRIPTION OF THE PRIOR ART

It is well known in the art to utilize electromechanical systems for measuring the material level in a bulk storage bin. Generally, conventional systems employ a plumb bob which is lowered into the bin by means of a cable or tape, from a reference point near the top of the bin to a depth where the plumb bob first contacts the material surface. The cable is then reeled back to return the plumb bob to the reference point while a counting circuit measures the retracted cable length, thereby providing a measure of the distance between the reference point near the top of the bin and the level of material stored in the bin. However, practical measurement systems, which require mechanical means for retraction of a cable or tape, further require means to scrape, wipe or clean the cable or tape during retraction in order to eliminate contamination of the cable take-up reel drive mechanism by the material in the bin.

SUMMARY OF THE INVENTION

It is an object of the present invention to provide a bulk material level measuring system having an improved bulk material level sensor which is motionless along a vertical axis.

In accordance with the present invention, a bulk material level measuring system includes a multiple link chain which is disposed along an axis between two vertically displaced reference points and has an upper end above and a lower end below the top surface of bulk material in the bin. All chain links above the top surface of the bulk material are free to rotate, with respect to their adjacent links, about the chain axis by a predetermined angular displacement before interferingly engaging the adjacent links. A rotational driving means having a predetermined torque limit is coupled to the upper end of the chain. The torque limit of the driving means is less than the resistive torque encountered (upon rotation of the upper end of the chain about its axis) by the lateral surfaces of those chain links which are below the top surface of the bulk material in the bin.

In operation, the driving means alternately rotates the upper end of the chain about its axis in first one and then the other direction, in each case continuing that rotation at least until it stalls with the chain upper end being angularly displaced by an amount equal to the sum of the individual angular displacements of all chain links which are free to rotate, i.e. those disposed above the top surface of the bulk material in the bin.

During each portion of the cycle, the maximum angular displacement of the upper end of the chain is proportional to and provides a measure of the distance from the top of the chain to the top surface of the bulk material in the bin, i.e. the level of bulk material in the bin.

BRIEF DESCRIPTION OF THE DRAWINGS

The present invention may be more readily described by reference to the accompanying drawings in which:

FIG. 2 is a sectional view of the topworks drive and sensor assembly for the system of FIG. 1;

FIG. 8 shows a front elevation of an exemplary operator's indicating panel for the system of FIG. 1;

FIG. 9 shows a front elevation of two links of chain for an alternative embodiment of the present invention.

DESCRIPTION OF THE PREFERRED EMBODIMENTS

Figure 1:
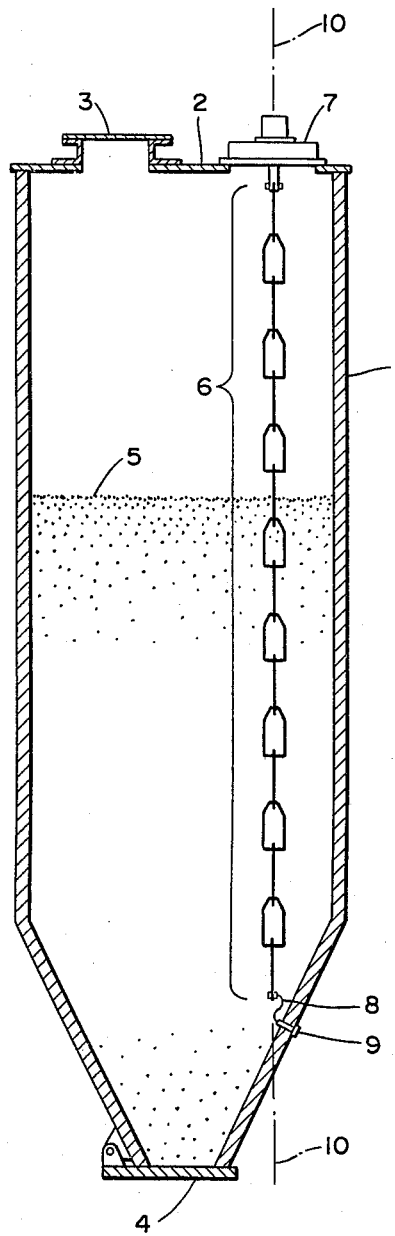
FIG. 1 is a sectional view of a material supply hopper showing the bulk material level measuring system of this invention.

Referring more particularly to the drawings by characters of reference, FIG. 1 discloses a hopper 1 containing bulk material 5, said hopper having a top panel 2, material feed inlet 3 and discharge gate 4.

This exemplary bulk material level measuring system includes a topworks drive and sensor assembly 7 (attached to hopper top panel 2) and a multiple link chain 6. The chain 6 is supported from the topworks assembly 7 and extends into hopper 1 along a vertical axis 10 through the regions in hopper 1 where a material level indication is desired. The bottom link of chain 6 is attached to a short cable 8 which in turn is anchored via anchor bolt 9 to a lower extremity of the hopper 1 in a manner assuring that the chain 6 is fully extended along a vertical axis. In alternative embodiments, the chain axis may be non-vertical provided the chain has an upper end above and a lower end below the top surface of the bulk material. In addition, the lowermost link may be rotationally fixed with respect to the chain axis.

FIG. 2 shows a sectional view of the topworks drive and sensor assembly 7 together with the two topmost links 12 and 15 of chain 6. The link 12 is supported from a slotted chain drive shaft 17 by means of bolt 19 and locknut 20 so that link 12 is constrained to rotate about axis 10 as shaft 17 rotates. Shaft 17 is supported by bearing 21 which permits axial rotation of shaft 17 while counteracting the downward thrust on shaft 17 due to the weight of chain 6.

The chain drive portion of assembly 7 includes a fluid transmission cup 23 containing viscous fluid 25 and a drive pulley 27, both being rigidly connected to the top portion of shaft 17. A reversible drive motor 31 is flange mounted to a top plate 33 which in turn is supported on a base plate 35 via standoff posts 37. The drive shaft 39 of a motor 31 passes through an oversized clearance hole in top plate 33 and is axially aligned and rigidly connected to the extension shaft 43 by the shaft coupling means 41. A plurality of outward extending rods 45 are connected to extension shaft 43 to form a fluid drive impeller in viscous fluid 25. By this fluidic coupling means, the drive motor 31 can rotate the chain drive shaft 17 (though not necessarily at an identical speed) as long as chain link 12 attached to the chain drive shaft 17 is free to rotate. If chain link 12 is not free to rotate, the chain drive shaft 17 stalls even though the drive motor 31 continues to rotate the extension shaft 43. It will be understood that by varying the viscosity of viscous fluid 25, or by varying the shape, size or number of rods 45, or by a combination of these things, the value of torque at which the chain drive shaft 17 stalls (i.e. the torque limit of the coupling means 41) may be adjusted to a predetermined value, substantially independent from the torque capacity of drive motor 31. In alternative embodiments, the driving means may comprise a motor having a predetermined stall torque limit together with a rigid coupling means in lieu of the motor with viscous coupling described for the present embodiment.

The sensor portion of assembly 7 includes a second grooved pulley 47 mounted on stub shaft 49, which in turn is supported from base plate 35 in bushing 50. The sensor portion of assembly 7 is coupled to the drive portion by a belt drive means (indicated in FIG. 2 by the dashed line 35) connecting pulleys 27 and 47. With this coupling, the angular rate of rotation of pulley 47 is proportional to that of pulley 27. A permanent magnet 51 having a north and a south pole is affixed to the top of pulley 47. A leaf switch 53 (having output terminals 57 and 59 and being encapsulated in a glass container having an inert gas atmosphere) is mounted at a predetermined distance from the magnet 51. Such a switch is well known to the art and is commonly referred to as a "reed switch." The switch 53 is responsive to its relative alignment to magnet 51 so that the switch contacts close whenever the magnet 51 is aligned with the leaves in the switch 53 and those contacts are open otherwise. Accordingly, this alignment condition is attained twice for each revolution of pulley 47. The number of contact closures of switch 53 is therefore related to the number of revolutions of chain drive shaft 17 as follows:

$$N = 2R \cdot \frac{D_{27}}{D_{47}},$$

where N is the number of contact closures of switch 53, R is the number of revolutions of shaft 17, and $D_{27}$ and $D_{47}$ are the respective diameters of pulleys 27 and 47. When the contacts of switch 53 close, a conductive path is established between terminals 57 and 59 which are electrically connected to a counter circuit which will be further described below.

Figure 3:
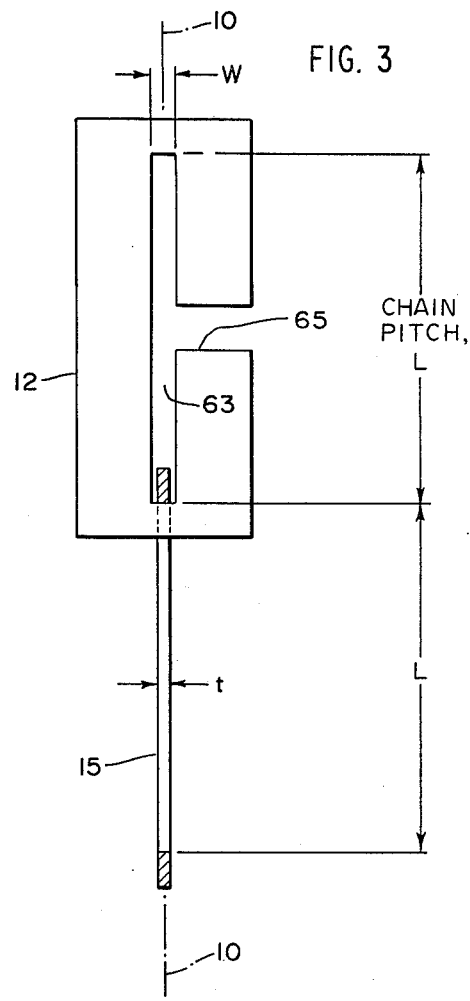
FIG. 3 shows a front elevation of two links of chain for the system of FIG. 1.
Figure 4:
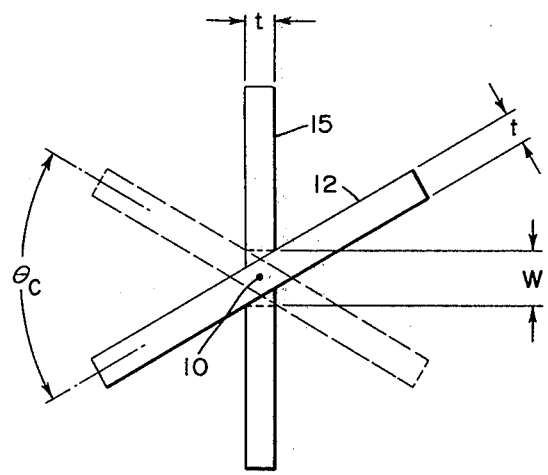
FIG. 4 shows an end view of two links of chain for the system of FIG. 1.

FIGS. 3 and 4 depict the two topmost links 12, 15 of chain 6 and, it will be understood that the other links of chain 6 are substantially identical to links 12 and 15. Each link consists of a rectangular plate of thickness t having a narrow rectangular slot 63 which has length L and width W. Each link further includes a second slot 65 disposed at right angles to slot 63, and to one side thereof, for use in joining and disjoining of the individual links of chain 6 as may be required in making up a desired length of chain. The width W of slot 63 is greater than the thickness t for each link so that, when two links are interconnected as shown in FIGS. 3 and 4, the first link e.g. link 12 is free to rotate with respect to the second link e.g. link 15 through a predetermined angle $\theta_c$ about axis 10. With this configuration, the cumulative rotational freedom of a multiple link chain $\theta_f$ is equivalent to the product of the number of links of chain, n, and individual link freedom for each pair, $\theta_c$:

$$\theta_f = n \cdot \theta_c$$

Since each of the n links has a predetermined chain pitch, L, the rotational freedom of any length of non-restricted chain may be alternatively expressed as:

$$\theta_f = \frac{\text{Length of Chain}}{L} \cdot \theta_c$$

It will be understood that in other embodiments, alternatively shaped links may be used in keeping with the present invention. For example, the corners of each link may be sheared off to form a tapered link in order to provide less resistance to the bulk material flow as it flows downward in the hopper toward the discharge gate 4.

In operation, the motor 31 is alternately controlled to rotate shaft 39 for a first time period in a clockwise direction and then for a second time period in a counter-clockwise direction in a manner described below in conjunction with FIGS. 5 and 6. The duration of each time period is controlled to be equal to or exceed the time required for motor 31 to rotate shaft 17 (via the fluidic coupling described above) in the amount of the maximum angle of rotational freedom, $\theta_f$, for chain 6 when all its links are unimpeded in their rotary motion by material 5 in the hopper 1. It will be understood that with bulk material 5 in the hopper, that portion of chain 6 lying below the top surface of the material is not free to rotate and that the links that are free to rotate are only those above that surface. As shown in FIG. 1, for example, the lowermost eleven links of chain 6 are not free to rotate since the resistive torque (due to the material 5) encountered by lateral surfaces of those links exceeds the stall torque associated with the fluid coupling means 41. Accordingly, the free length of chain extending between the shaft 17, and the surface of the bulk material 5 (e.g., in FIG. 1, the topmost six links of chain 6), will wind up through its rotational freedom alternately in a clockwise direction and in a counter-clockwise direction in response to the drive motor 31.

Since the angular rotation of shaft 17 during each portion of the repetitive cycle, is proportional to the number of unimpeded links of chain 6, i.e. the free length of chain extending from the shaft 17 to the material surface below, the number of contact closures occurring at switch 53 within each of the same time periods is also proportional thereto. The constant of proportionality relating the number of contact closures to the length of unimpeded chain is determined by the diameter ratio, $$\frac{D_{27}}{D_{47}},$$

of pulleys 27 and 47. By appropriately selecting the pulley diameter ratio, and connecting a resettable electro-magnetic counter across terminals 37 and 39 of switch 53, to be responsive to the change in conductivity between those terminals, an output signal is provided which is indicative of the length of free chain, and hence, the distance between shaft 17 and the material 5 surface within the hopper 1.

As thus described, the count state of the counter following each portion of the cycle is an inverse measure of the level of material 5 in the hopper, i.e. a measure of the depth of the empty space in hopper 1 above the material 5. Alternatively, a predetermining counter may be connected across terminals 37 and 39, replacing the above-described counter, to provide a measure of the distance from the hopper discharge gate 4, up to the top surface of the material 5. Using such a counter, a predetermined count state is set into the counter, representative of the full distance between discharge gate 4 and shaft 17 prior to each portion of the operating cycle. Each change in conductive state of switch 53 then controls the counter to increment downward from the preset count state toward "zero," in effect subtracting the "empty" depth of hopper 1 from the total depth, yielding the remaining depth of material 5.

Figure 5:
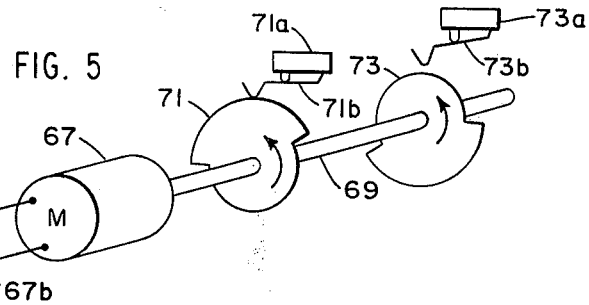
FIG. 5 shows an exemplary cycle programmer for the system of FIG. 1.
Figure 6:
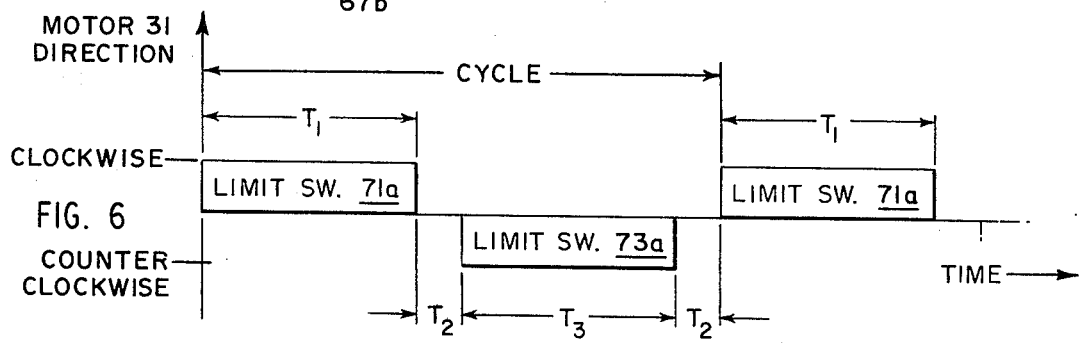
FIG. 6 shows an exemplary programmed limit switch time-graph.

The above-described cycle of alternately driving the shaft 39 in a clockwise direction and then in counter-clockwise direction may be provided, for example, by utilizing a two limit switch programmer as shown in FIG. 5. Programmer drive motor 67 is a single speed motor having input power lines 67a and b. Motor 67 drives shaft 69 in a continuous manner in the direction indicated. Cams 71 and 73 are mounted on shaft 69, together with limit switches 71a and 73a, respectively. By a suitable selection of contours for the cams 71 and 73, and by appropriately selecting a drive motor speed, the limit switches 71a and 73a may be alternately actuated by the cams in combination with associated relays to provide control signals for motor 31. For the embodiment depicted in FIG. 6, a clockwise signal (provided by switch 71a when lever arm 71b is depressed by cam 71) may energize motor 31 in a clockwise direction, and a counter-clockwise signal (provided by switch 73a when lever arm 73b is depressed by cam 73) may energize motor 31 in a counter-clockwise direction. The time periods T1, T2 and T3 as shown in FIG. 6 are determined by the contours of cams 71 and 73 and their relative alignment on shaft 69. As described above, the cams are selected so that periods T1 and T3 match or exceed the time required to displace shaft 31 through the angle $\theta_f$ when there is no material in the hopper.

Figure 7:
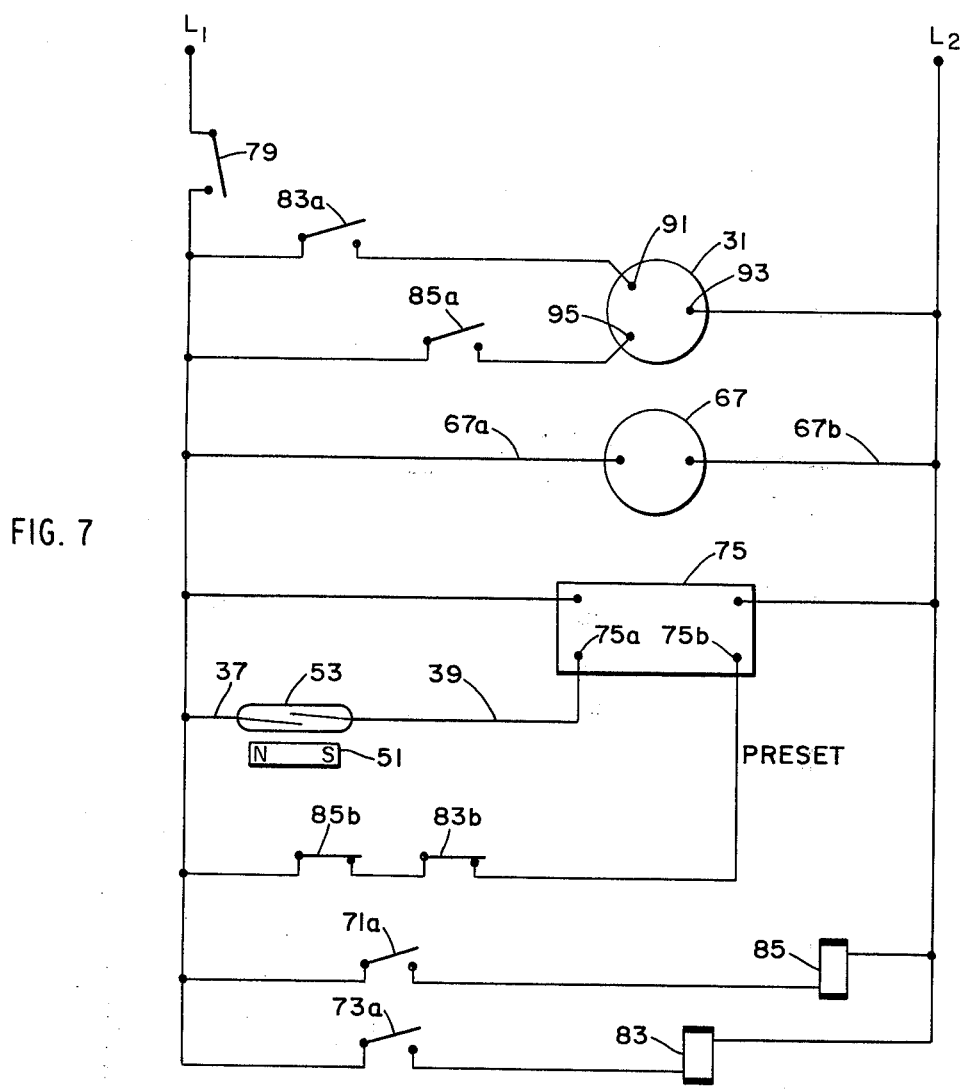
FIG. 7 shows an exemplary wiring diagram in schematic form for the system of FIG. 1.

FIG. 7 shows a control circuit in schematic form for the exemplary system described above. FIG. 8 shows an exemplary panel 77 which contains a power on-off switch 79 and a predetermining counter-display 81.

Referring to FIG. 7, lines $L_1$ and $L_2$ denote the incoming 117 volt a.c. power lines. Switch 79 provides operator means for connecting power to the control circuitry for the system. With switch 79 closed, power is applied to the programmer drive motor 67, thereby cycling the limit switches 71a and 73a. A relay 83 is actuated to close contacts 83a and open contacts 83b when the contacts 73a are closed by cam 73. Similarly, a relay 85 is actuated to close contacts 85a and open contacts 85b when the contacts 71a are closed by cam 71. The alternate closure of a one of switches 71a and 73a, and actuation of the associated one of relays 83 and 85 provides clockwise and counter-clockwise control signals for motor 31, as shown in the timegraph of FIG. 6. There is a short duration dwell period, T2, which is programmed by cams 71 and 73 to occur between each limit switch actuation. During this dwell time, the contacts of relays 83 and 85 remain in their "normal" state (i.e. contacts 83a and 85a are open and contacts 83b and 85b are closed as shown in FIG. 7).

In operation, either relay 83 or relay 85 may be initially energized to activate the reversible drive motor 31. Assuming that at the initiation of power via switch 79, limit switch 71a is first closed by its associated cam 71, thereby energizing control relay 85 and applying power across terminals 93 and 95 of the motor 31, motor 31 rotates in a clockwise manner, driving the chain 6 by way of the viscous liquid 25 and shaft 17. As shaft 17 rotates, pulley 27 drives pulley 47 and magnet 51 by means of belt 35 and in turn causes the contacts of the magnetically operated switch 53 to open and close in response thereto. Each contact closure by switch 53 provides power to the count terminal 75a of the predetermined counter 75 which causes the counter to count downward toward a "zero" count state. Because the duration in which limit switch 71a is held closed by cam 71 is longer than that necessary to cause the chain 6 to wind up its total rotational freedom, shaft 17 will stall owing to the torsional loading caused by the contacting bulk material prior to switch 71a being opened. At the time limit switch 71a is opened, the rotationally free links chain 6 are fully wound, thereby establishing the reference from which the first meaningful count cycle may be initiated.

Following the opening of limit switch 71a and prior to the closure of limit switch 73a, power is applied via the normally closed contacts of relays 83 and 85 to the count preset terminal 75b of the predetermining counter 75 to reset that counter to the reference count state. When limit switch 73a is closed, thereby energizing control relay 83, power is applied across terminals 91 and 93 of motor 31 and that motor is driven in its counter-clockwise direction, thereby winding the chain 6 in the opposite direction from that of the previous portion of the cycle. As the chain winds up, count pulses arising from the magnetically induced closure of the contacts of switch 53 direct the predetermined counter to count down from its preset count state toward zero until shaft 17 again stalls against the torsional load caused by the bulk material 5 in the hopper 1. When shaft 17 has come to rest, the count state of the predetermining counter is representative of the material level in the hopper 1. Following the opening of switch 73a, power is applied via the normally closed contacts of relays 83 and 85 to reset the counter 75 to its reference count state. Thereafter, each alternate cycle of reversible drive motor 31 updates the material level reading associated with counter 75 so that a continuous "sample and hold" count display is provided by display 81.

FIG. 9 shows an alternative embodiment of the chain 6 wherein a plurality of U-shaped links (two of which are shown in FIG. 9 i.e., links 97 and 98) are rigidly connected with spacing L along a cable 99 (or wire, or rope) of known torsional deflection characteristics. The top end of cable 99 is rotated in the same manner as the first chain link 12 in the above-described embodiment. Again the uppermost links (above the bulk material surface) are rotationally displaced along axis 10 until each link interferingly engages with the next lower link of the chain. It will be understood that the torque required to further rotate the links below the material level is in excess of the stall torque of the fluid coupling. At the point of full rotation of all links above the material level, the cumulative rotational displacement of the top end of cable 99 provides a measure of the level of bulk material in the hopper.

The invention may, of course, be embodied in other forms without departing from the essential characteristics thereof. The present embodiment is therefore to be considered in all respects as illustrative and not restrictive, the scope of the invention being indicated by the appended claims rather than by the foregoing description.

I claimed:

1. Apparatus for measuring the level of bulk material comprising, in combination,
   an elongate member, each lengthwise element of said member being rotatable through a predetermined angle about a lengthwise axis relative to each adjacent element, each element being adapted for transmitting torque to said adjacent elements at the limits of said angle, and formed to develop appreciable resistance to rotation about said axis by reaction against said bulk material,
   means to suspend said member with said axis extending between points displaced vertically to subtend the levels to be measured,
   means to apply a drive torque about said axis to the upper end of said member, said torque having sufficient magnitude to rotate the portion of its length above the level of said bulk material but insufficient magnitude to rotate the portion reacting against said material,
   and means to measure the angle of rotation of said upper end.

2. Apparatus according to claim 1, in which the means to apply the drive torque comprise
   a motor having a torque at least as great as said drive torque, and
   a torque limited coupling driven by said motor and driving said upper end of said member.

3. Apparatus according to claim 2, in which the coupling has an input shaft driven by said motor, an output shaft driving said upper end of said member, and fluid drive means interconnecting said input and output shafts.

4. Apparatus according to claim 1, in which the means to apply the drive torque are adapted to reverse direction after the portions above said level have transmitted torque to a portion below said level.

5. Apparatus according to claim 4, in which the means to apply the drive torque rotate between limits each defined by the transmission of torque to a portion below said level by the portions above it.

6. Apparatus according to claim 1, in which the means to apply the drive torque comprise
   a torque limited motor for generating the drive torque, and
   means for coupling said motor to said upper end.

7. Apparatus for measuring the level of bulk material comprising, in combination,
   a chain having a plurality of links, each link being rotatable through a predetermined angle about a lengthwise axis relative to each adjacent link, each link being adapted for for transmitting torque to each of said adjacent links at the limits of said angle, and formed to develop appreciable resistance to rotation about said axis by reaction against said bulk material,
   means to suspend the chain with said axis extending between points displaced vertically to subtend the levels to be measured,
   means to apply a drive torque about said axis to the uppermost link, said torque having sufficient magnitude to rotate the links above the level of said bulk material but insufficient magnitude to rotate a link reacting against said material,
   and means to measure the angle of rotation of said uppermost link.

8. Apparatus according to claim 7, in which the means to apply the drive torque comprise
   a motor having a torque at least as great as said drive torque, and
   a torque limited coupling driven by said motor and driving said upper end of said member.

9. Apparatus according to claim 8, in which the coupling has an input shaft driven by said motor, an output shaft driving said upper end of said member, and fluid drive means interconnecting said input and output shafts.

10. Apparatus according to claim 7, in which the means to apply the drive torque are adapted to reverse direction after the links above said level have transmitted torque to a link below said level.

11. Apparatus according to claim 10, in which the means to apply the drive torque rotate between limits each defined by the transmission of torque to a link below said level by the links above it.

12. Apparatus according to claim 7, in which the chain is suspended with said axis vertical.

13. The combination of claim 7 with means to display a signal representative of the angular displacement of said uppermost link.

14. Apparatus according to claim 7, in which the lowermost link is rotationally fixed with respect to said axis.

15. Apparatus according to claim 7, in which the means to apply the drive torque comprise
   a torque limited motor for generating the drive torque, and
   means for coupling said motor to said upper end.

16. A method for measuring the level of bulk material in a storage bin comprising the steps of:
   A. extending a multiple link chain along an axis through said bulk material with said chain having an upper end disposed at a reference point above the top surface of said bulk material and having a lower end below said top surface,
   B. driving said upper end to rotate about said axis with an applied torque less than a torque having sufficient magnitude to overcome the torsional impedance imposed by said bulk material on any one of said links below said top surface, said applied torque being continuously applied until a portion of the lateral surface of the links of said chain above said top surface are interferingly engaged.

17. The method of claim 16 including the further step of measuring the angular displacement of said upper end following the termination of said applied torque.

18. The method of claim 16 wherein said step of driving said upper end is repetitively performed with an alternately directed applied torque.

* * * * *